March 8, 1960 W. A. SHERBONDY 2,927,543
COOKY PRESS AND COOKY DOUGH CARTRIDGE
Filed Jan. 7, 1955

INVENTOR.
WILLIAM A. SHERBONDY
BY
Oberlin & Limbach
ATTORNEYS

United States Patent Office

2,927,543
Patented Mar. 8, 1960

2,927,543

COOKY PRESS AND COOKY DOUGH CARTRIDGE

William A. Sherbondy, Chagrin Falls, Ohio

Application January 7, 1955, Serial No. 480,577

1 Claim. (Cl. 107—52)

The present invention relates generally as indicated to a cooky press and to a cooky dough cartridge for use with such press.

As is well known in the art, cooky presses usually comprise a thin-walled cylinder body which is formed with rolled threads at its opposite ends for screwing thereonto of a die-holding cap and a guide or screw thread bushing cap, the rod of a piston slidably extending through the latter cap in the case of ratchet feed pistons or threadably engaging said bushing cap in the case of screw feed pistons.

In both cases aforesaid, the piston moves in the cylinder body to displace the cooky dough or like substance therein through a die held by said die-holding cap. The die which is thus held at the one end of said body is provided with an opening of the desired design, whereby advancement of the piston in the cylinder body causes the cooky dough to be extruded through the die opening onto a cooky sheet or the like for baking.

The screw-type presses are well known in the art, and for an example of the ratchet feed type of plunger, reference may be had to my prior Patent No. 2,634,692, granted April 14, 1953, which, in addition, shows a cooky press in which the cylinder body and caps are formed with complementary projections and depressions forming a bayonet-type lock.

In the aforesaid types of cooky presses, the rolled or pressure-formed threads and bayonet lock elements of the cylinder body hamper the thorough cleaning of the body after use thereof, since the dough will accumulate in the helical grooves or bayonet depressions and harden therein. Improper cleansing of the cylinder body is unsanitary and may discolor and contaminate the entire batch of cooky dough loaded into the cylinder body the next time that the press is put to use, and may, in fact, impart a rancid or other undesirable taste in the freshly baked cookies.

It is, accordingly, a primary object of this invention to provide a cooky press and cartridge which avoids the above-referred-to and other objections to prior known devices of this character.

It is another object of this invention to provide a cylinder body which is of smooth, uniform diameter throughout its entire length without any thread grooves, bayonet-lock depressions, or the like in which the dough of the body may accumulate.

Another object of this invention is to provide a cartridge in which the cylinder body is of smooth, uniform inside diameter and has detachably, but snugly telescoped therewithin, an end wall structure incorporating the die or pattern.

Another object of this invention is to provide a cartridge, preferably of the disposable type, which comprises a cylinder body closed at both of its ends and having at the die end thereof a frangible or puncturable sealing disc which is operative until broken to effectively seal the contents from leaking exteriorly and to preclude atmospheric exposure of the contents.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

Figures 1, 2, 3, 4:
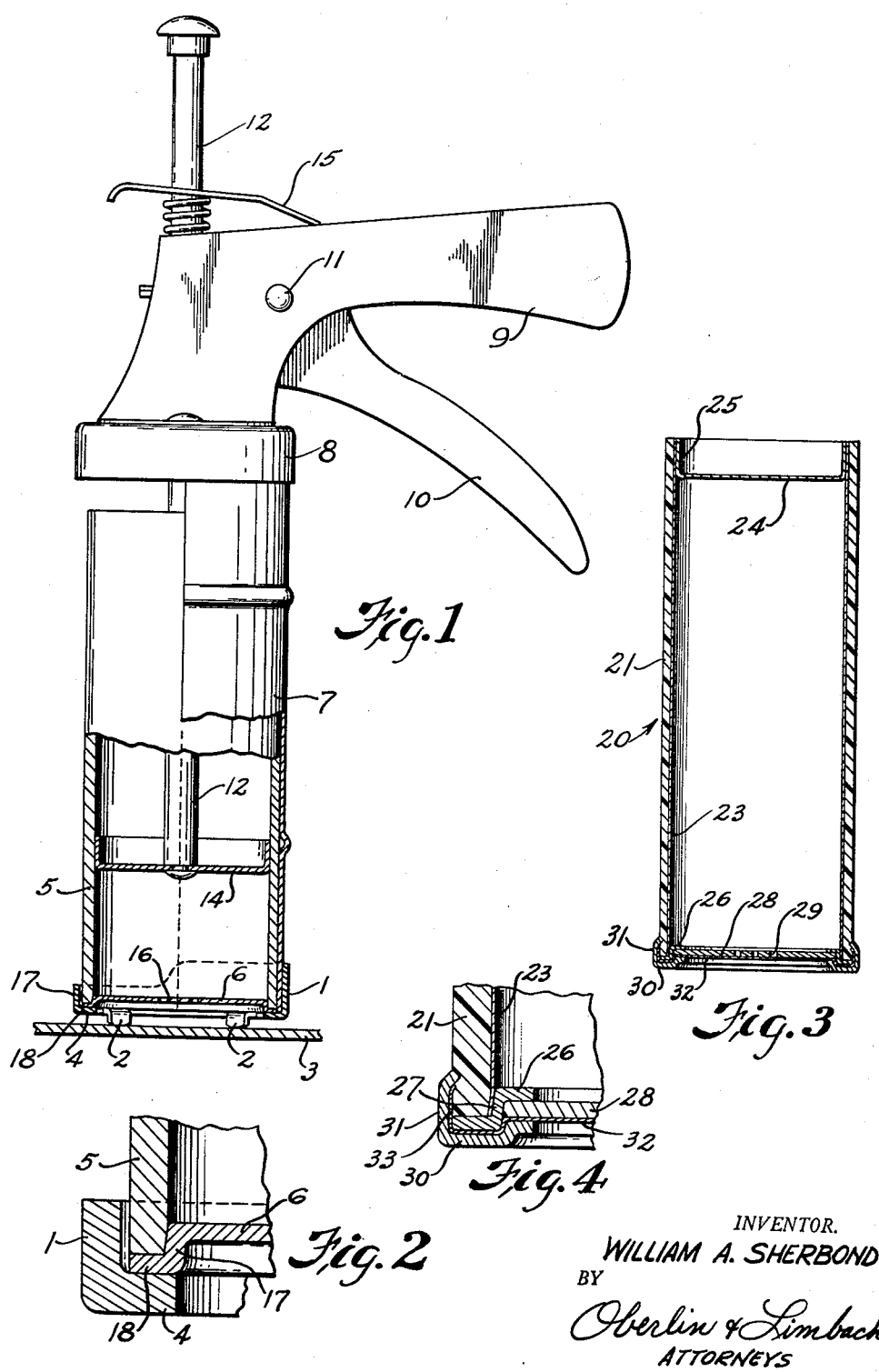
Fig. 1 is a side elevation view of a preferred form of cooky press, the lower portion thereof being in section to clearly illustrate the internal construction.
Fig. 2 is a much-enlarged fragmentary section view of the lower end of the cooky press herein.
Fig. 3 is a longitudinal section view diametrically through a sealed form of cartridge in which cooky dough or the like is adapted to be stored and frozen.
Fig. 4 is a much-enlarged fragmentary cross-section view of the lower end portion of the Fig. 2 cartridge.

Referring first to the cooky press as a whole, or what is herein termed the "dispensing unit," the same comprises an end ring 1 integrally formed with legs 2 adapted to support the unit in elevated position with respect to a cooky sheet 3 or the like onto which the extruded and shaped cooky dough is adapted to be dispensed, said ring 1 providing an inturned flange or shoulder 4 constituting an abutment for the cooky dough container 5 having a die closure 6 which will presently by described in detail.

Said end ring 1 is welded or otherwise secured at the lower end of a semi-cylindrical saddle or body piece 7, and secured to the upper end of said saddle 7 is a ring 8 which mounts the handle 9 by which the dispensing unit is grasped for dispensing the contents of the cartridge 5 through the die closure 6.

Said handle 9 has a trigger or operating lever 10 pivotally connected thereto at 11 which is effective to incrementally feed the piston rod 12 and piston 14 connected thereto axially downwardly a predetermined distance each time that the trigger or lever 10 is swung toward the handle 9. The details of this ratchet feed mechanism are of no moment herein and may exemplarily comprise the mechanism such as is shown in my aforesaid prior patent.

Of course, an advantage of the ratchet feed mechanism herein is that the piston 12 may be quickly withdrawn simply by depressing the release lever 15 and pulling the piston rod 12 upwardly, and moreover the ratchet type feed incrementally advances the piston the same amount each time and thus extrudes equal volumes of the cooky dough, whereas with a screw-type press, such uniform feed is not so readily achieved.

Referring now to the container or cartridge 5 and its die closure 6, the cartridge is shown in Figs. 1 and 2 as comprising a plain, open-ended cylinder made of aluminum, for example, of say 1/16" wall thickness and 2" diameter so as to be relatively rigid, such relatively heavy wall eliminating sharp edges at opposite ends thereof. Said cylinder body 5 is of uniform and smooth inside diameter throughout its length or at least that portion of the length in which the piston 14 is adapted to be operated.

By reason of the smooth internal bore of the cylinder body 5, there are no grooves or depressions therein in which the cooky mix will accumulate and harden, and make thorough cleaning a difficult task. Thus, with a plain, smooth-bore cylinder 5, as herein shown, it is a simple matter to cleanse the interior surface thereof thoroughly from one end to the other by means of a brush, rag, or other suitable cleaning implement.

The die 6 herein has a disc-like die portion having a central opening or openings 16 of the desired design, and for examples of a few typical designs, reference may be had to my aforesaid prior patent. Such disc-like die portion is inset with respect to the end of the cylinder body 5, and the die closure 6 includes a skirt 17 as an integral portion thereof which is telescoped within the end of the body 5 preferably is formed with a slight taper on its exterior surface so as to have a wedge-like or cork-like fit in the cylinder body 5 to form an efficient seal against leakage of the cooky mix when dispensed under pressure through the die opening 16.

As a practical matter, the die skirt 17 thus telescoping within the cylinder body may be say 1/16" long and have a taper of approximately 1-3° with respect to the axis of the cylinder body 5, the small end of the die closure 6 in the plane of the die opening being substantially equal in diameter to the normal inside diameter of the cylinder body 5, whereby said die will have a snug wedge fit in the body and will be retained therein during the positioning of the body 5 and its die closure 6 in the dispensing unit.

The die closure 6 is provided at its outer end with a radially outwardly extending flange 18 which, as clearly shown in Fig. 2, is adapted to abut the end surface of the cylinder body 5.

In the use of the invention herein described, the housewife having prepared the cooky dough, will insert the desired die closure in either end of the cylinder body 5 and then the dough will be loaded into the cylinder body from the remaining open end, or, if desired, the body 5 may be loaded with dough from either or both ends before the die closure 6 is inserted in place.

Then, the piston 14 of the dispensing unit is fully withdrawn upwardly into the upper ring 8 or to a point high enough to permit lateral insertion of the body 5 and its die closure 6 with the lower end thereof resting upon the inturned flange 4 of the bottom ring 1.

All that now remains to be done is to actuate the trigger 10 to cause the piston 14 to enter the upper end of the cylinder body 5, whereupon the cooky dough will be displaced under pressure through the die opening 16 onto the cooky sheet 3, and when the dispensing unit as a whole is lifted away from the cooky sheet 3, the extruded dough, shaped as desired by the die opening 16, will remain stuck to said sheet and the dough will part in the plane of the die portion.

The dispensing unit is then moved to another position on the cooky sheet 3, and the trigger 10 pulled again to extrude another predetermined batch of dough.

It is to be noted that, by reason of the insetting of the die portion, the legs 2 of the bottom ring 1 can be relatively short as shown while yet there is provided the desired clearance between the die portion and the cooky sheet 3.

Although the foregoing description is primarily related to a device for dispensing dough for baking cookies, it is to be understood that other similar substances may be expelled from the cylinder body 5 through the die opening 16 for making biscuits, canapes, or for cake decorating purposes. Likewise, it may be desirable in some instances to pull the trigger 10 more than once especially when the cookies or the like to be formed are to be of relatively large size.

A noteworthy feature of the present dispenser is that the advancement of the piston 14 downwardly results in a frictional drag between the cooky dough and the body 5 which tends to move the body 5 downwardly, thereby holding the die closure 6 tightly in the lower end of the body.

After the use of the dispensing unit has been completed, it is a simple matter to upwardly withdraw the piston 14 out of the cylinder body 5 and to remove the body 5 and its die closure 6 from the dispensing unit for cleansing. The die closure can be readily removed by pushing from the open end of the cylinder body 5 or by prying with the fingernail, with a knife blade, or like implement inserted between the end of the body 5 and the flange 18 of said die closure.

Referring now to the sealed cartridge 20 illustrated in Figs. 3 and 4, the same comprises a cylinder body 21 which preferably is a length of paper mailing tube lined with metal such as aluminum foil 23, for example, to provide an impervious liner which is unaffected by the ingredients of the cooky dough or other viscous substance contained therein. In this case, the upper end of the body 21 is sealed as by means of a thin cup-shaped metal stamping 24 also preferably of aluminum, the cylindrical skirt 25 of which is a snug, sliding fit inside the body so as to constitute a plunger or piston when moved longitudinally in the body toward the other end thereof.

The lower end of said body 21 has inserted therein a die closure comprising a reinforcing ring 26 which may have a tapered, exterior skirt 27 as described in connection with the die closure 6 shown in Figs. 1 and 2. The inner end of said reinforcing ring 26 terminates in an inturned flange which is inset with respect to the end of the body 21 and with a radially outwardly extending flange which abuts the end surface of the body and thus serves as a positioning stop to position the reinforcing ring 26 perpendicularly with respect to the axis of the cylinder body.

Telescoped within the reinforcing ring 26 and thus constituting additional reinforcement against deformation of the lower end portion of the cartridge body 21 is the die disc 28 provided with the desired design of die openings 29 therethrough, said die disc engaging the inturned flange of said reinforcing ring 26 and being held there by the inturned flange of an outer ring 30 which telescopes within said inner reinforcing ring 26 and which has an outer skirt 31 which is adapted to be spun or crimped radially inwardly as shown to grip the wall of the cartridge body 21 between the reinforcing ring 26 and said skirt 31.

Interposed between the inturned flange of said outer ring 30 and the outer surface of said die disc 28 is a frangible sealing disc 32 of aluminum foil, tin foil, plastic, parchment paper, or other impervious film material which remains unaffected by the constituents of the contents of the cylinder body and which is effective to prevent leakage of the contents through the die opening. Said sealing disc 32 preferably extends radially outward and then is formed with a skirt 33 gripped between the outside surface of the cartridge body 21 and the crimped skirt 31 of the outer ring member 30 to thus provide a fluid-tight seal against leakage of the contents around the end of the body between the inner reinforcing ring 26 and said body 21 and between said outer ring 30 and said body 21.

The cooky dough cartridge 20 of Figs. 3 and 4 therefore holds the contents in fluid-tight manner against external leakage and also against access of atmospheric air thereto, and it is proposed to freeze the dough therein, whereby the purchaser thereof may at any time thaw out the cartridge and insert the same into a suitable dispensing unit such as that shown in Fig. 1.

In order to use the cartridge 20 shown in Fig. 3, the frangible or puncturable sealing disc 32 is torn away around the inner edge of the outer ring 30, and then all that it is necessary to do is to load the cartridge into the dispensing unit and to actuate the rod thereof to force the piston 24 downwardly.

The puncturing or fracturing of the sealing disc may be effected easily by poking a hole through the center thereof and then tearing the disc to uncover the die openings 29, and invariably, because of the use of very thin foil or parchment paper or plastic, the tearing will progress around the inner edge of said outer ring 30.

It has been found desirable to make the die disc 28 of relatively heavy gauge aluminum or other metal of say .016" thickness, and to make the inner reinforcing ring 26 and outer ring 30, both of which are drawn to cup shape and the latter of which has a flange which needs to be crimped or spun of much thinner gauge stock such as .005" thickness.

In the case of the construction of Figs. 1 and 2, it is desired to employ as few pieces as possible; and, therefore, the die portion is integral with the generally cylindrical skirt 17 and radially outwardly extending flange 18, and thus there will be one cylinder body 5 and a choice of several dies without necessity of employing any separate cap or the like.

Moreover, if the die closure 6 of Figs. 1 and 2 were not cupped to telescope in or over the body 5, a flat die would have to engage the lower end surface of the cylinder body 5 and then a second part would have to be employed to embrace the exterior of the cylinder body to form the necessary seal. Also, the use of a flat die in Figs. 1 and 2 would position the same so close to the lower end of the dispensing unit that the legs 2 would have to be increased substantially in length.

Other modes of applying the principle of the invention may be employed, change being made as regards the details described, provided the features stated in the following claim, or the equivalent of such, be employed.

I therefore particularly point out and distinctly claim as my invention:

A cooky dough container for use with a dispensing unit comprising a tubular metallic body having a relatively thick rigid wall of smooth uniform inside diameter throughout its length and a cooky pattern die closure at one end of said body through which the cooky dough is adapted to be dispensed, said die closure including a skirt portion telescoped within said body and a circular wall portion at the inner end of said skirt portion having a die opening therein, said circular wall portion being of substantially the same diameter as the inside diameter of said tubular metallic body, said die closure further having an outturned flange at the outer end of said skirt portion extending parallel to said circular wall portion and abutting the end surface of said tubular body, said skirt portion being slightly outwardly tapered within the range of from 1 to 3° with respect to the axis of said tubular metallic body, and forming a wedged, sealed engagement within said body, said skirt portion extending within said tubular body approximately $\frac{1}{16}$ of an inch and said skirt portion forming such wedged sealed engagement along the entire axial length thereof whereby said die will be held in place during the positioning of said body and die in such dispensing unit, said die being readily implement removable from said tubular metallic body.

References Cited in the file of this patent

UNITED STATES PATENTS

| | | |
|---|---|---|
| 2,101,075 | Krag | Dec. 7, 1937 |
| 2,478,078 | Battenfeld | Aug. 2, 1949 |
| 2,512,178 | Sherbondy | June 20, 1950 |
| 2,536,649 | Lindsey | Jan. 2, 1951 |
| 2,572,206 | Sherbondy | Oct. 23, 1951 |
| 2,582,156 | Peterson | Jan. 8, 1952 |
| 2,602,571 | Sherbondy | July 8, 1952 |
| 2,634,692 | Sherbondy | Apr. 14, 1953 |